Feb. 11, 1958  A. W. H. PORTER ET AL  2,822,604
WARPING MACHINES
Filed Jan. 19, 1955  19 Sheets-Sheet 3

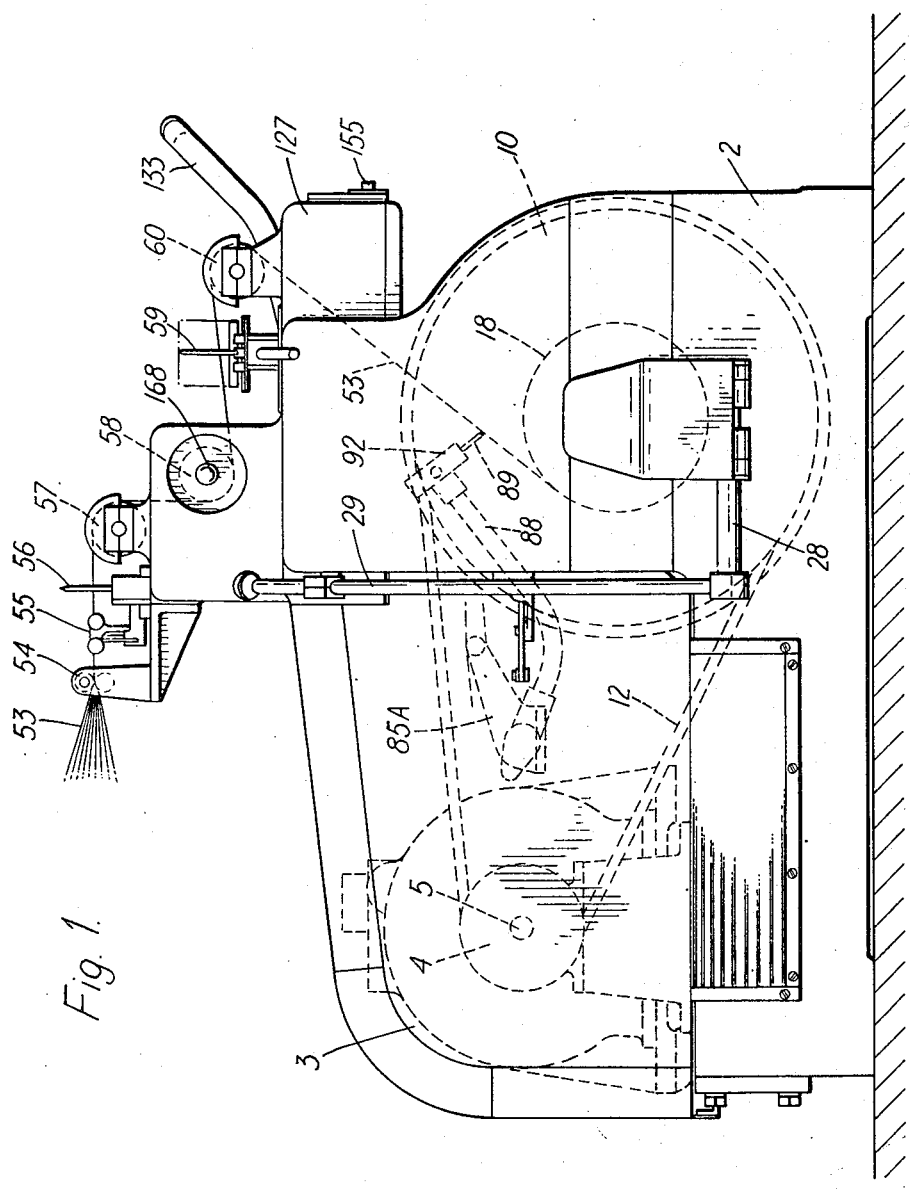

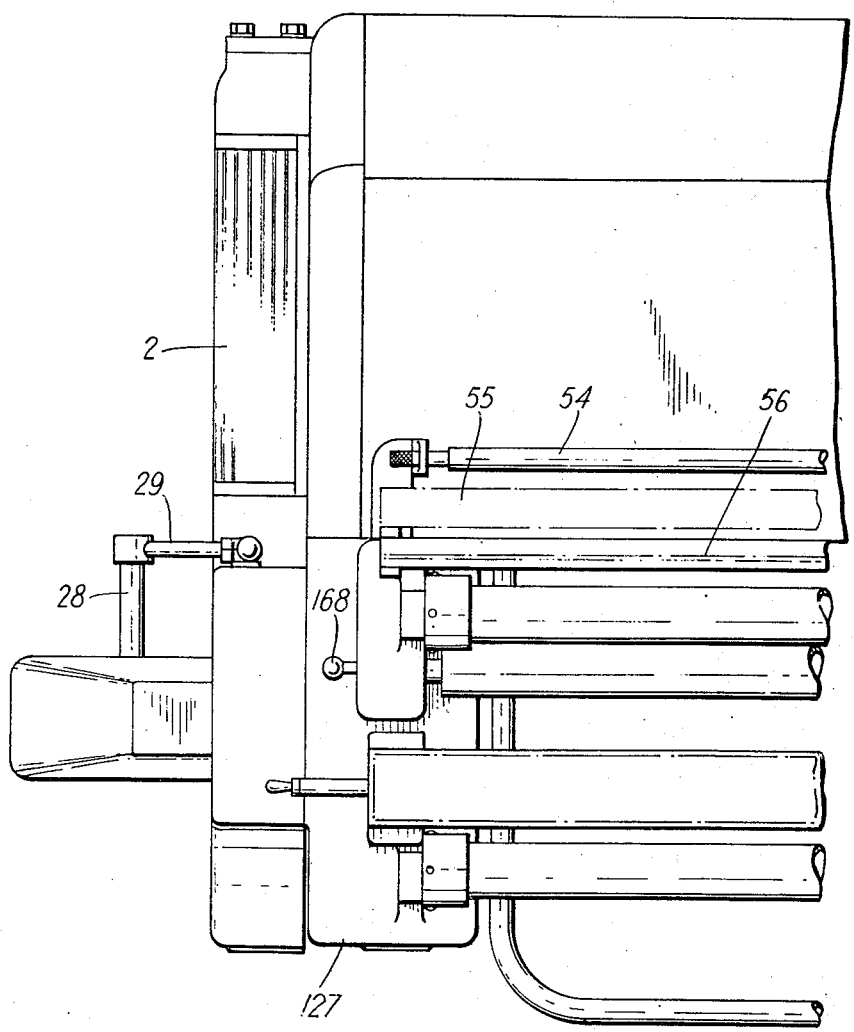

Inventors
ALLAN W. H. PORTER, WILLIAM C. ARNOLD
and ANDREW ROBERTSON
By Holcombe, Wetherill & Brisebois
Attorneys

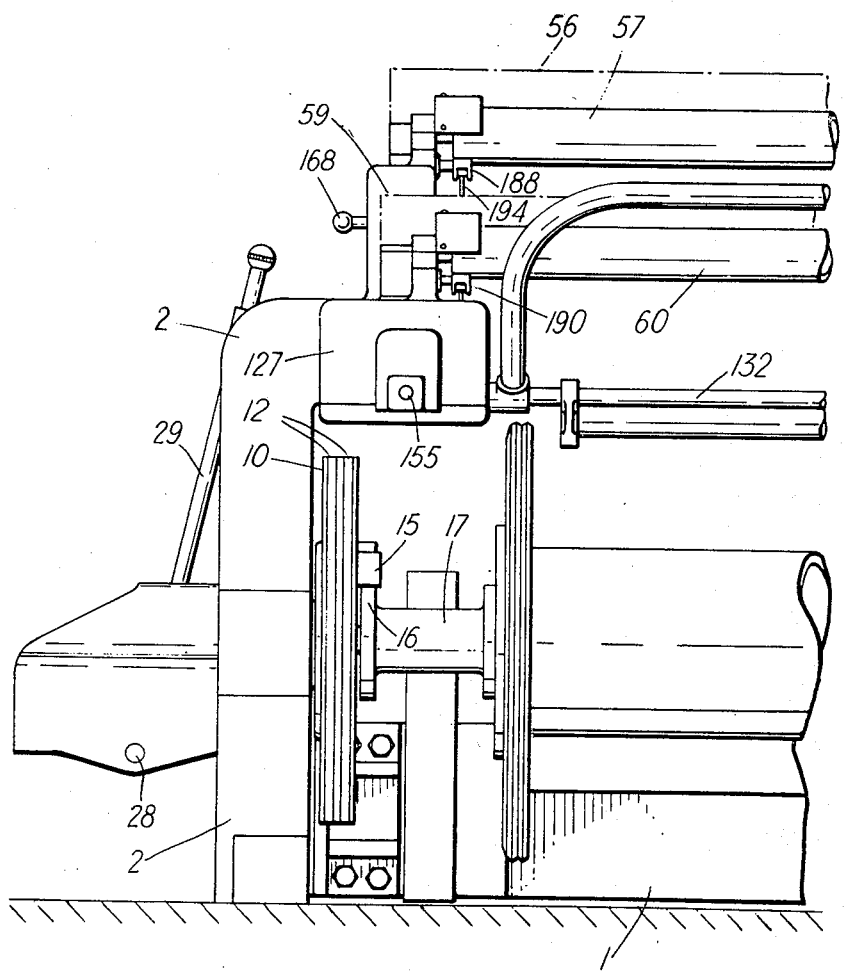

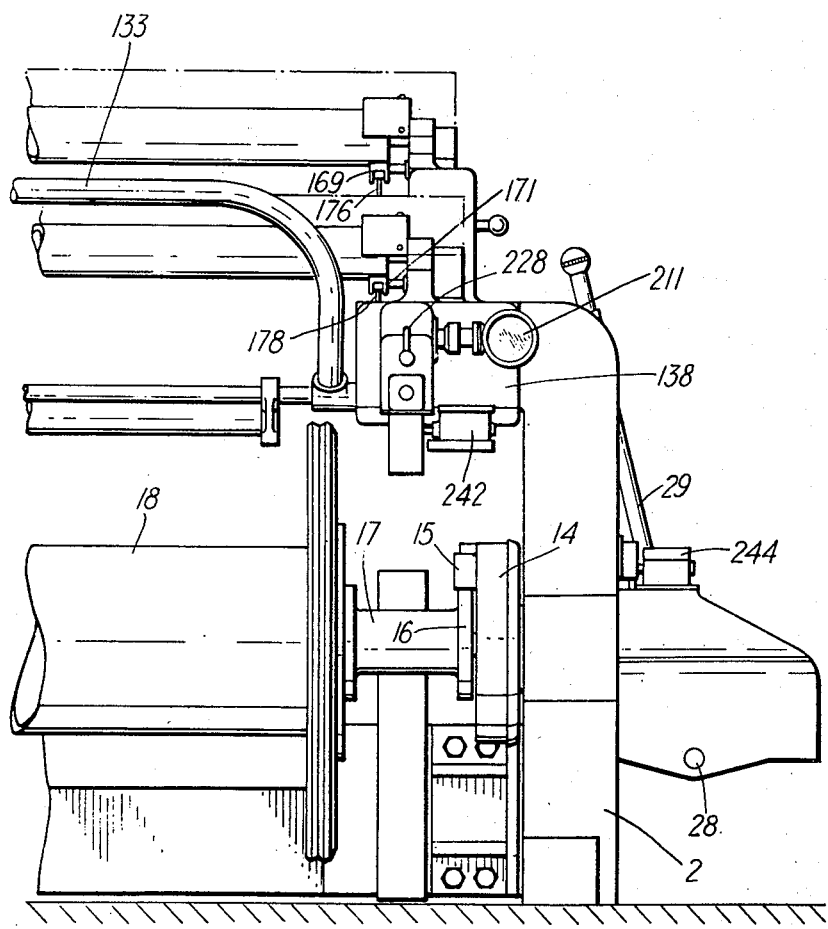

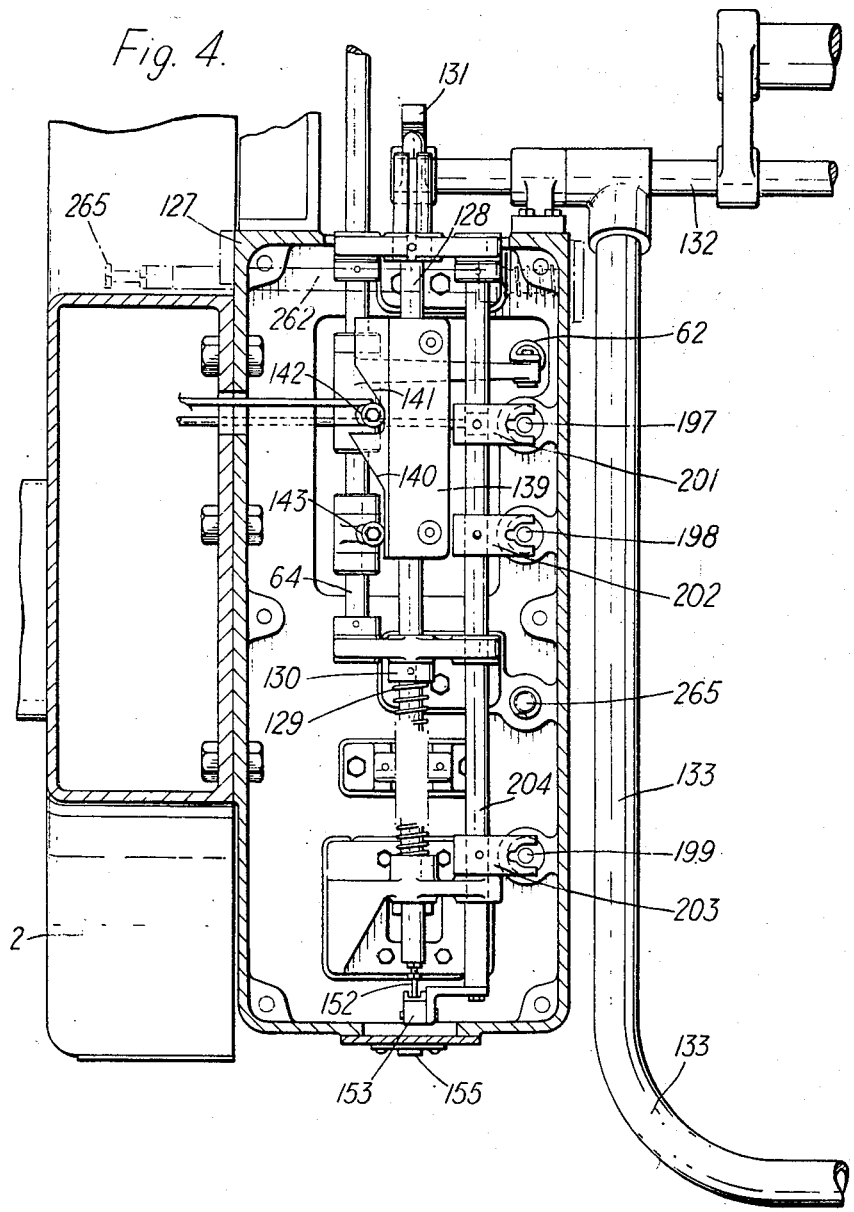

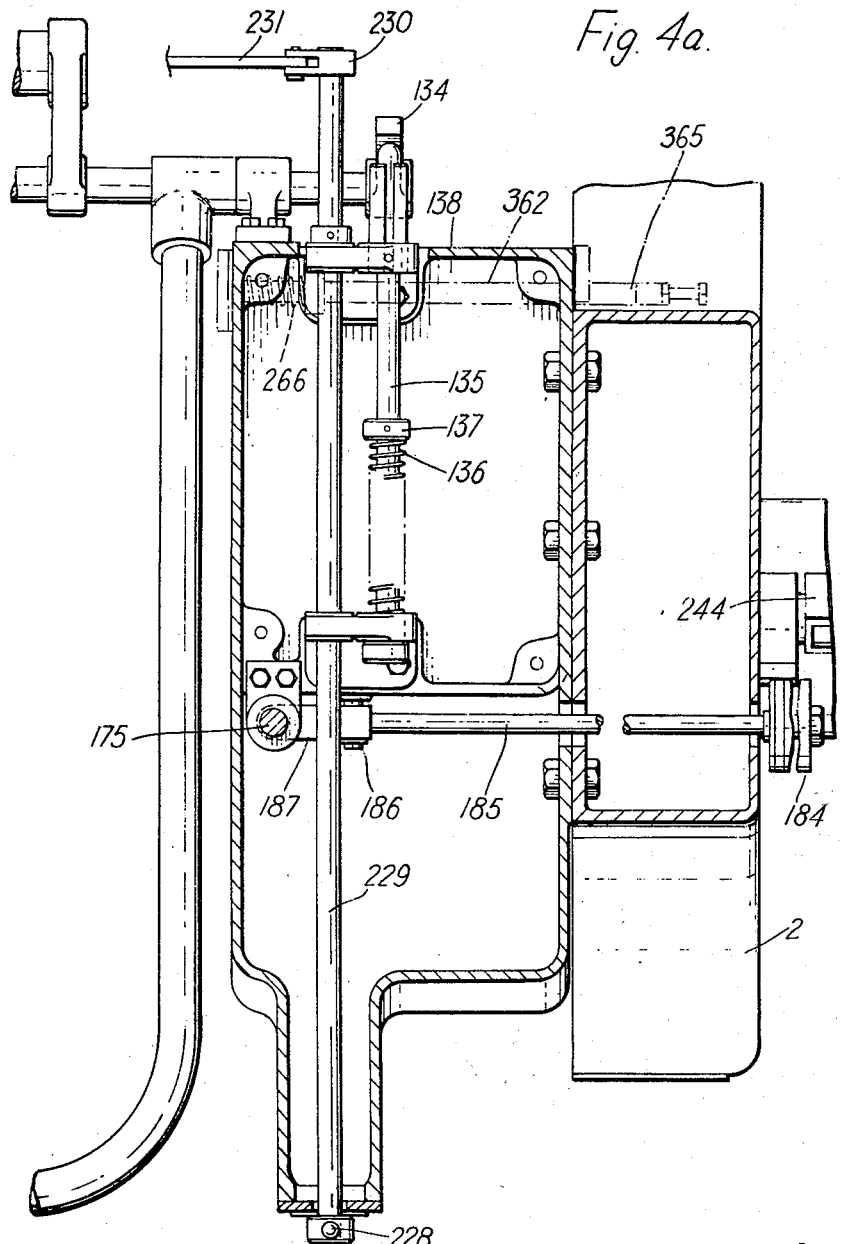

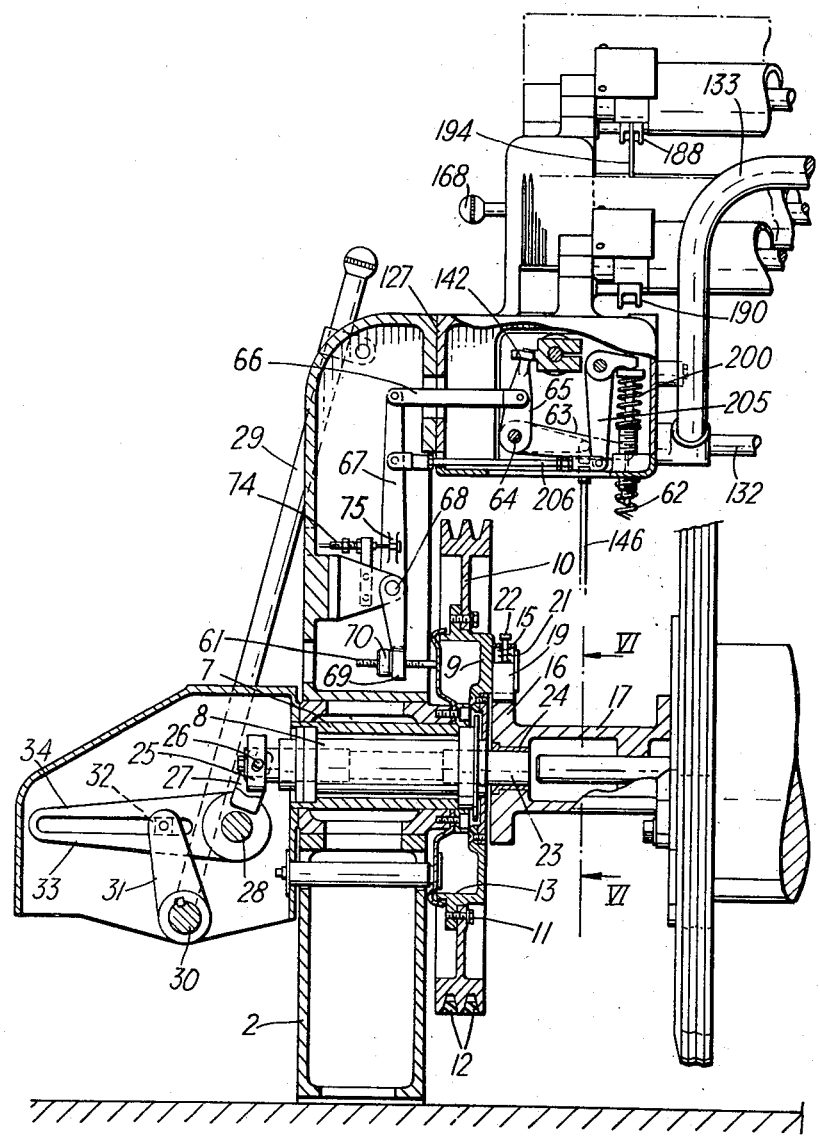

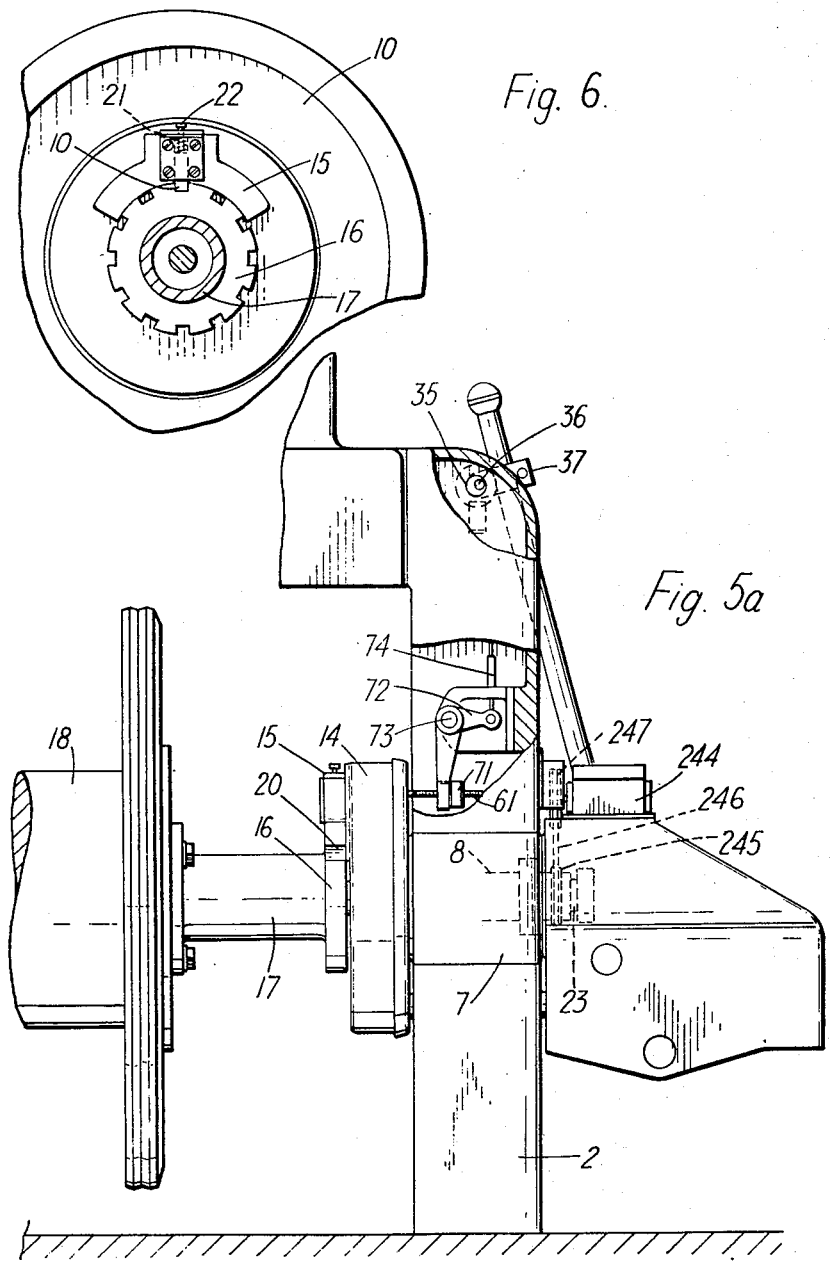

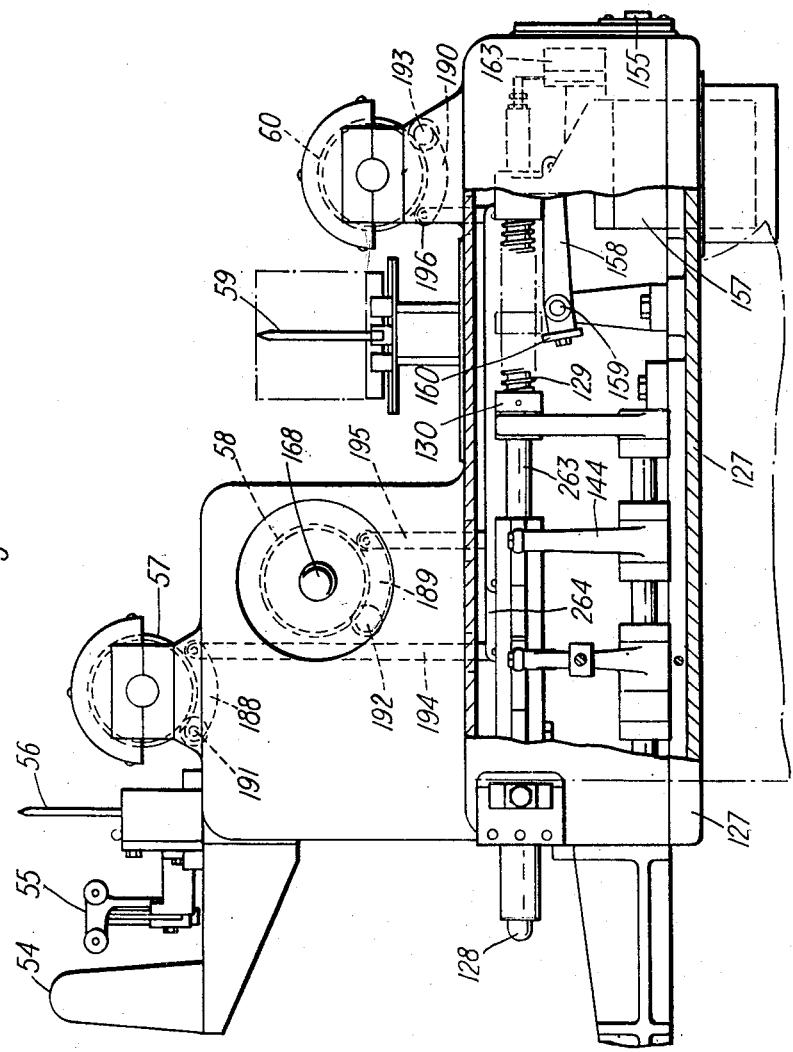

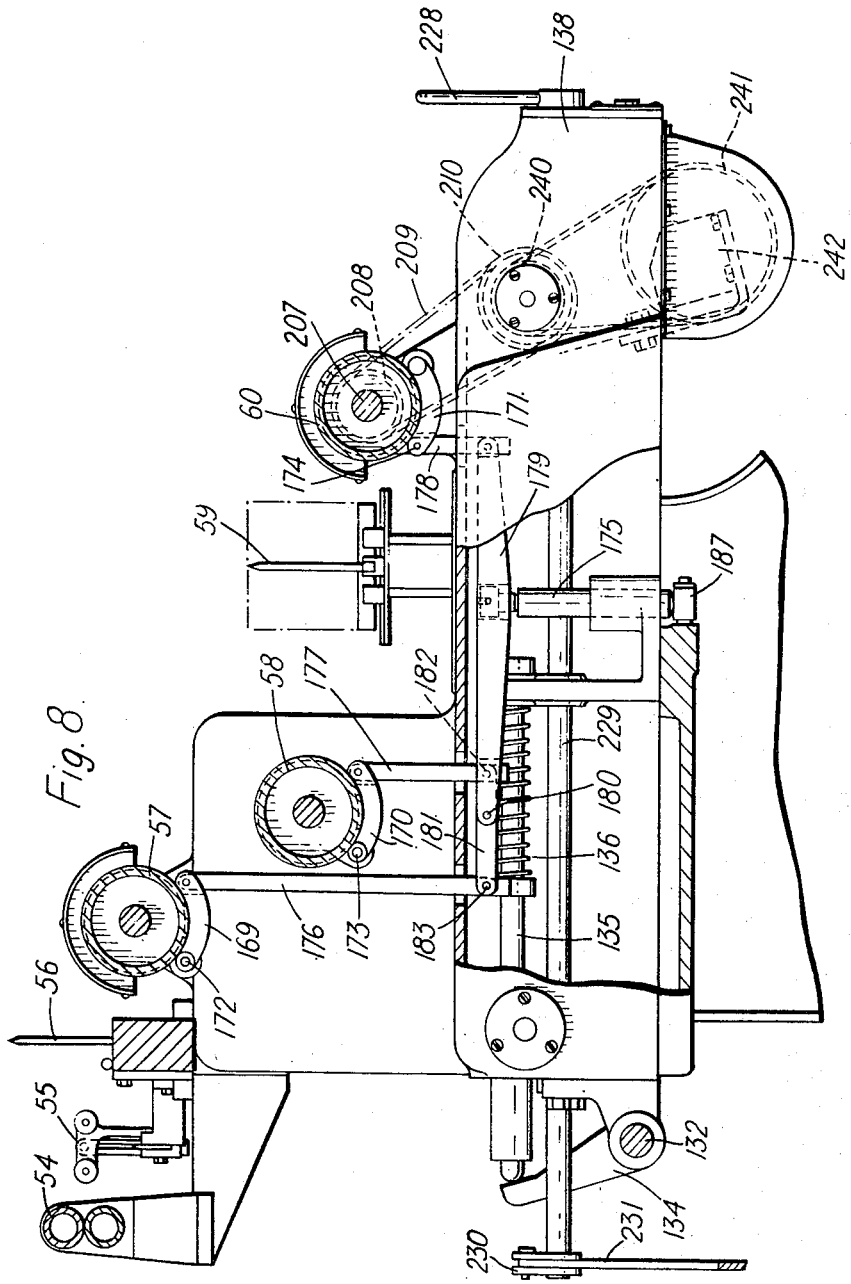

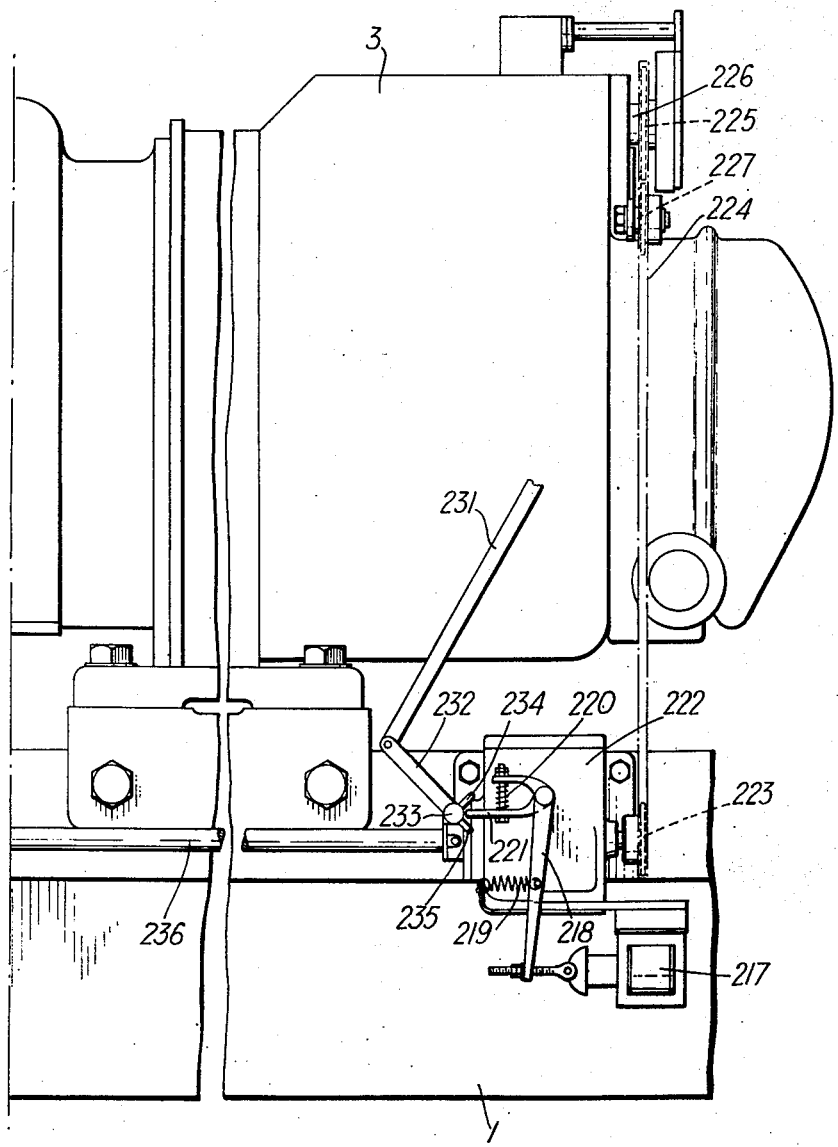

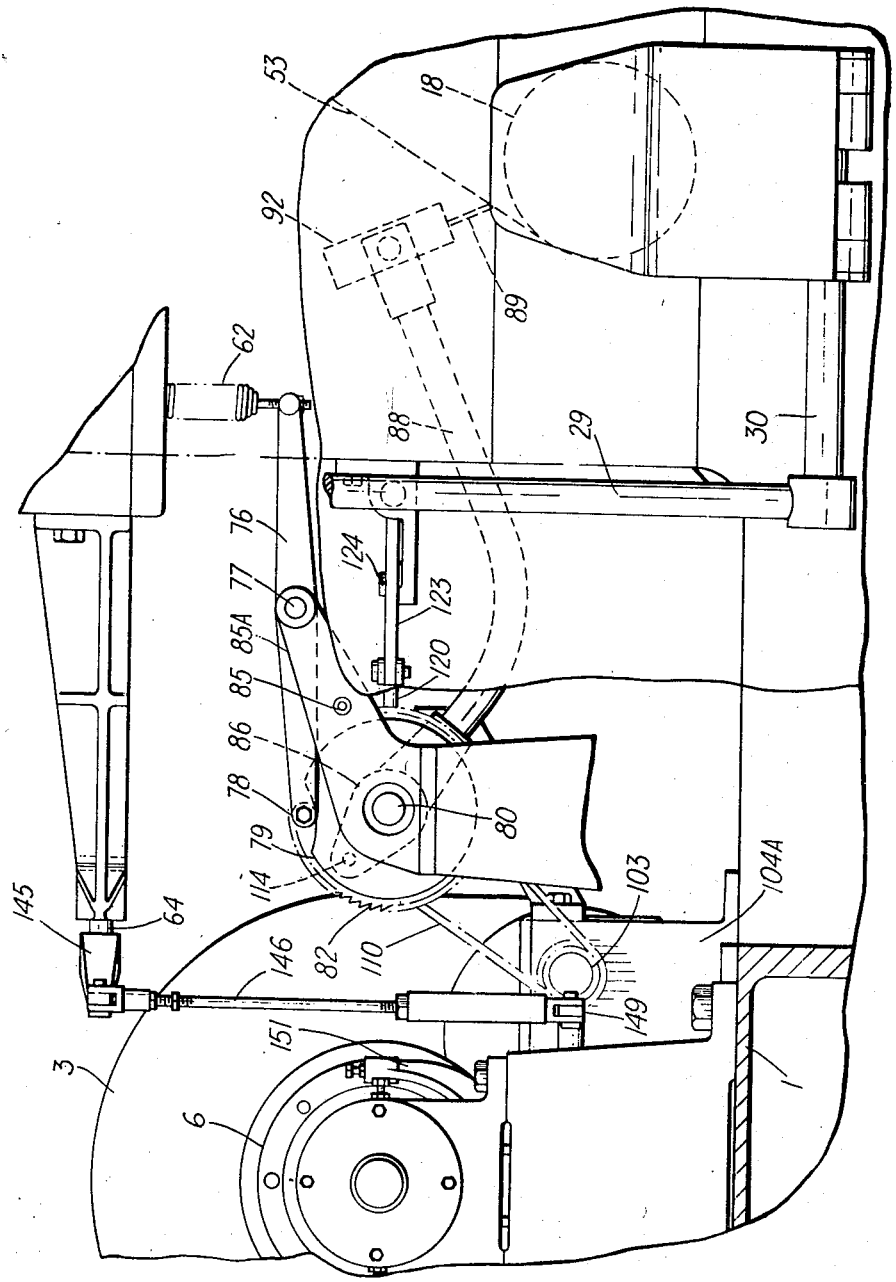

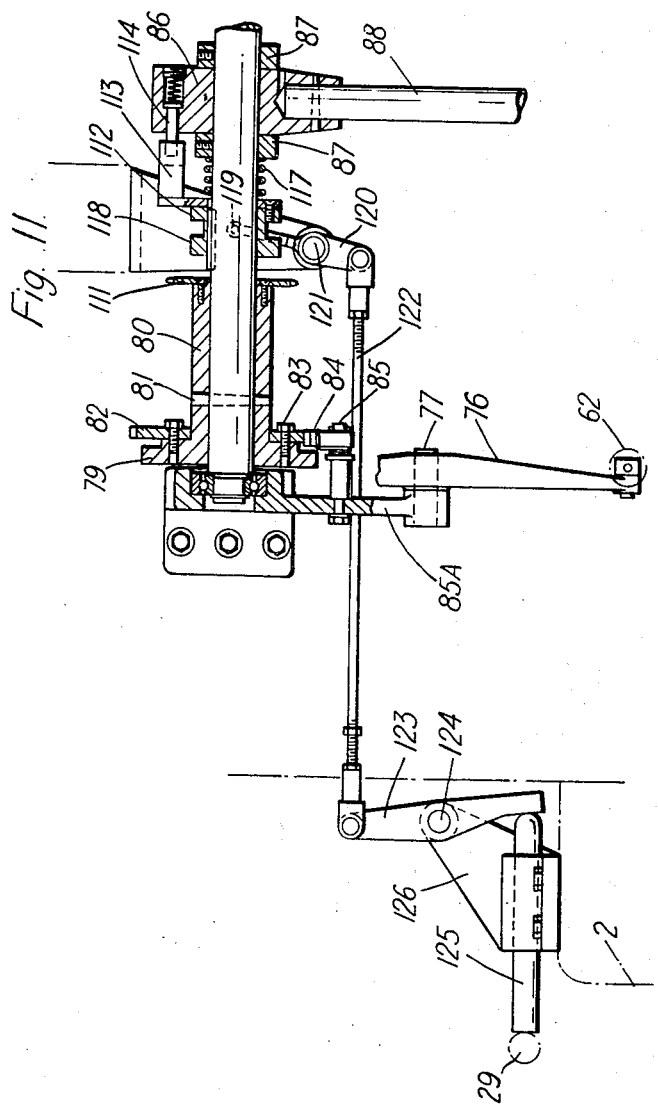

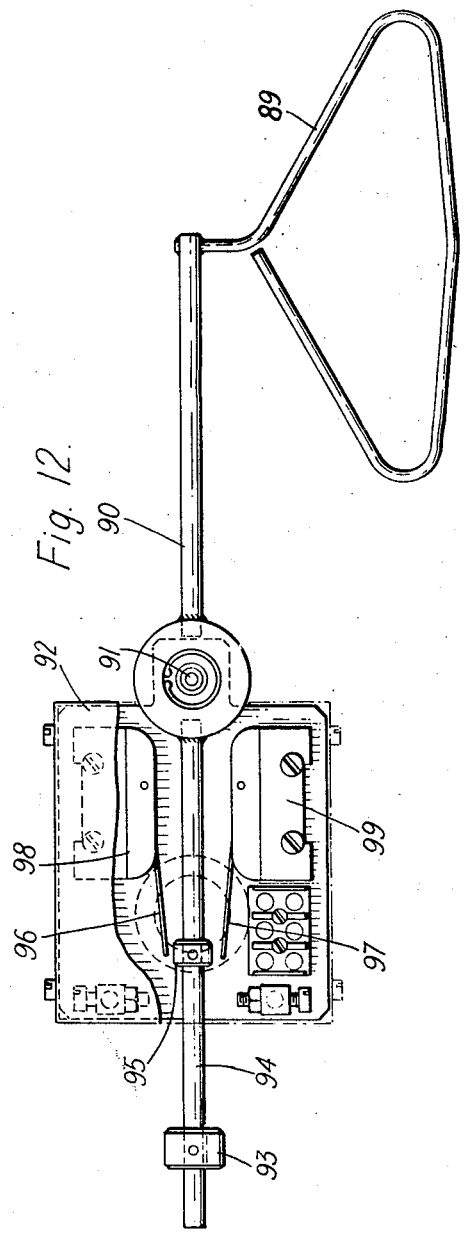

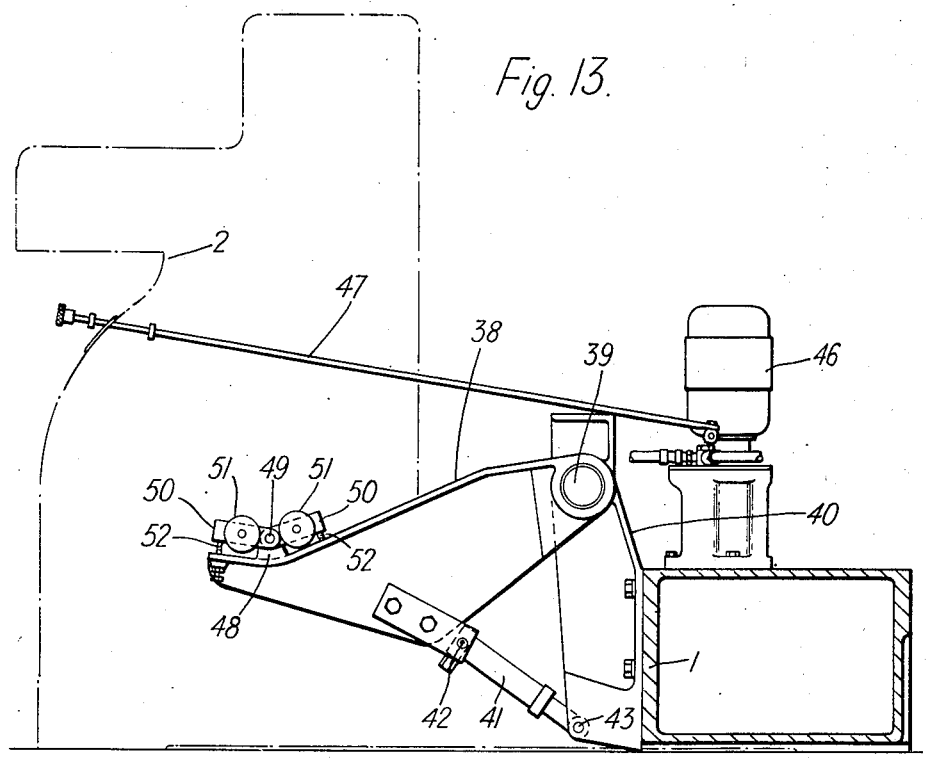

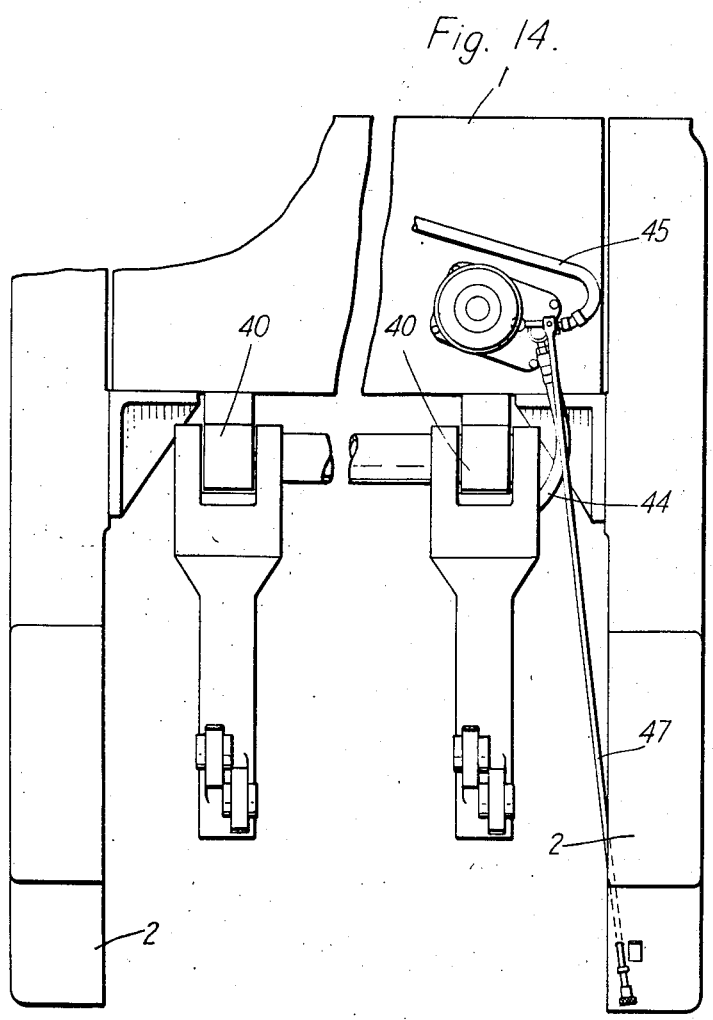

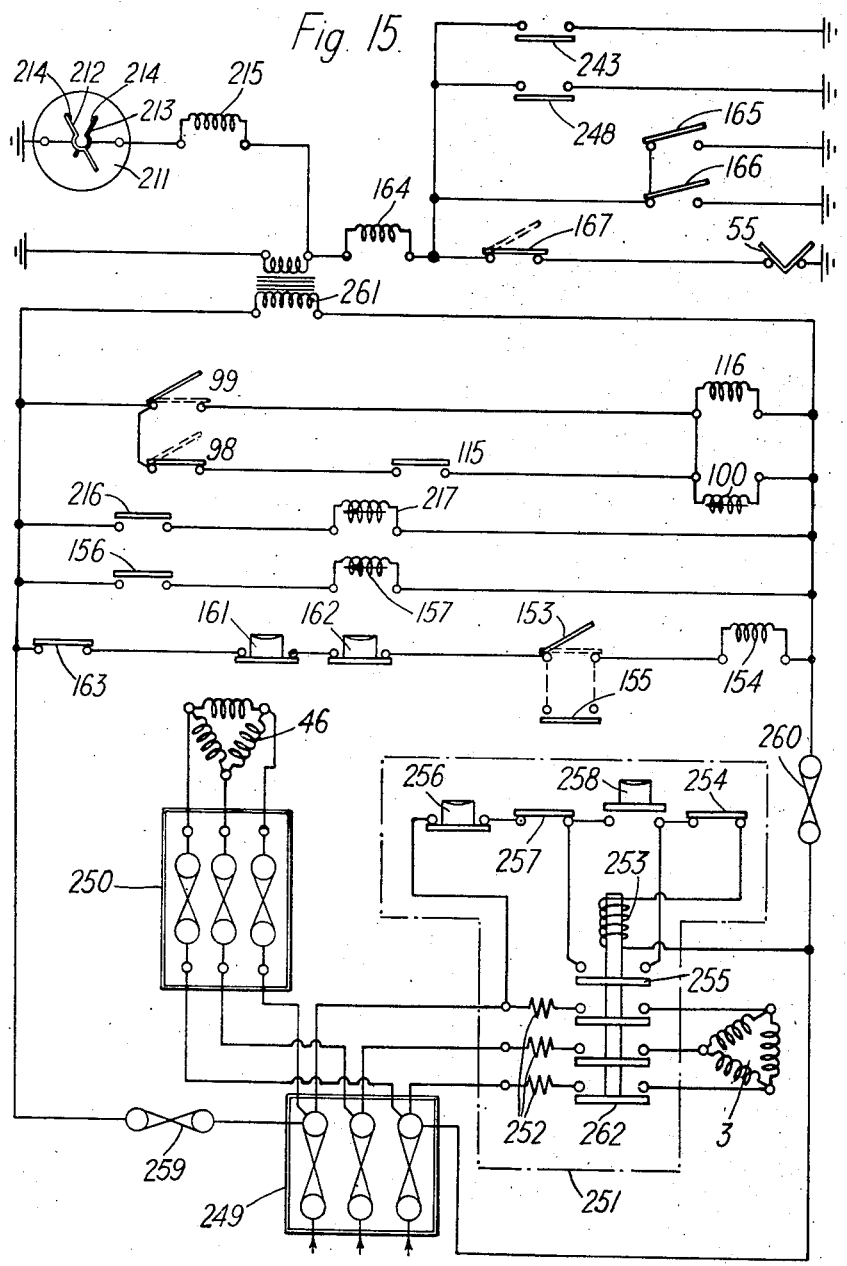

United States Patent Office 2,822,604
Patented Feb. 11, 1958

2,822,604

WARPING MACHINES

Allan William Henry Porter and William Charles Arnold, Burton-on-Trent, and William Charles Arnold, Burton-on-Trent, and Andrew Robertson, Bristol, England, assignors to F. N. F. Machinery Manufacturing Company Limited, Burton-on-Trent, England Application January 19, 1955, Serial No. 482,848

15 Claims. (Cl. 28—36)

In warping machines for winding on to beams the warp yarns for looms and warp knitting machines it is preferable that the operations required to be carried out by the machine operator should be as few and as simple as possible and that the operator should be able to install an empty beam in the machine, wind the beam and remove it from the machine without other assistance. Furthermore, the braking effort which can be applied to bring the beam to a standstill should vary as the weight of yarn on the beam increases otherwise the braking may be too light for a full beam so that an inordinately long time is required to bring a full beam to rest, or may be too violent for an empty beam. The tension rollers however do not increase in inertia during winding and therefore require a constant braking effort for stopping which should be adjusted so that the tension rollers and the beam both come to a standstill at the same time. The function of these rollers is not only to arrange the yarns in an orderly manner but to even out the tension in the yarns and impart the necessary and desired tension to them before they are wound on the beam thus ensuring that when the yarns are drawn off the beam in weaving or knitting the cloth resulting is uniform throughout its length. The tension imparted to the yarns by the tension rollers may be varied by increasing the number of rollers around which the yarns have to pass and also by providing adjustable retardation to these rollers so that they are braked continuously during winding. The present invention enables this to be done using the same brake mechanism as is used to bring the rollers to a standstill when winding is stopped for any reason and also provides a simple and effective arrangement for varying the braking effort on the beam itself so that the beam is stopped at the same time as the rollers no matter what weight of yarn has been wound upon it.

The present invention also provides an improved arrangement of the head-stock and tail-stock between which the beam is supported, and also enables the beam to be raised mechanically into the correct position for engaging the head-stock and tail-stock, and then for these parts to be engaged, very simply and quickly.

It is also necessary, in order to ensure that the winding of the beam should be even, that the rate at which the yarn is drawn from a creel on to the beam should be constant throughout the winding of the beam. As the diameter of the beam increases therefore, it is necessary for the speed at which the beam is driven to be progressively reduced, and the present invention also provides a simplified mechanism for controlling the speed of the variable speed alternating current electric motor by employing the power of the motor itself to drive the mechanism for rocking the brushes.

According to the invention, the beam is rotated between fixed centres and a feeler is provided to bear lightly on the sheet of warp yarns so as to be moved as the diameter of the sheet of warps increases and the movement of this feeler causes an adjustment of the braking effort available to stop the beam. Preferable the feeler is connected so that its movements cause the actuation of a cam upon which a follower bears which is linked to a spring in which the energy is stored which provides the braking effort to stop the beam so that, as the diameter of the warps on the beam increases the stress in the spring is adjusted by an amount determined by the contour of the cam, with the result that, when the brakes are released, either at the wish of the operator or by some form of stop motion, the requisite braking effort is applied.

The head-stock and tail-stock, between which a beam may be mounted, each consists of a flange member carrying a part engageable with the beam by which the beam may be driven and retarded, and a central spigot independent of the flange member and which may be withdrawn while the beam is introduced and then moved so as to project inwards into the hub of the beam and support it. Thus the functions of driving and supporting the beam are separate and although the spigot may rotate with the beam it does not have any part in driving or retarding it. The beam is preferably driven at one end by a pulley attached to the flange of the head-stock at that end and this flange also carries a brake drum of an internally expanding brake. The tail-stock is not driven but the flange also carries a similar brake drum. Arrangements may be provided so that the spigot of both the head-stock and the tail-stock may be moved in and out simultaneously. Preferably the flanges have sector pieces projecting from their inwardly facing surfaces shaped to fit the outer surface of the hub of the beam so as to locate this hub accurately in relation to the spigot. By arranging that these parts are uppermost when the beam is to be removed, the beam can be dropped clear of the flanges once the spigots have been withdrawn without interference. Preferably the head-stock and the tail-stock are placed as low as possible so as to carry the beam just clear of the floor, and lifting arms are provided operated hydraulically or mechanically, to engage the hubs of the beam so as to lift the beam off the floor into alignment with the spigots.

An example of a warper according to the present invention is shown in the accompanying drawings, in which:

Figure 1 is a side elevation of the warper;

Figures 2 and 2a together constitute a fragmentary plan view of the end portions of the warper, the mid-portion of which is broken away;

Figures 3 and 3a together constitute a fragmentary front elevation of the ends of the warper, as seen from the right in Figure 1;

Figures 4 and 4a together constitute a plan view in part section of the control mechanism;

Figures 5 and 5a together constitute a fragmentary front elevation showing the head-stock and tail-stock and brake mechanism in part section;

Figure 6 is a section of Figure 5 on the line VI—VI;

Figure 7 is a side view as seen from the left in Figure 3 of part of the control mechanism and the tension rollers in part section;

Figure 8 is a similar view to Figure 7 in part section on the line VIII—VIII in Figure 3;

Figure 9:
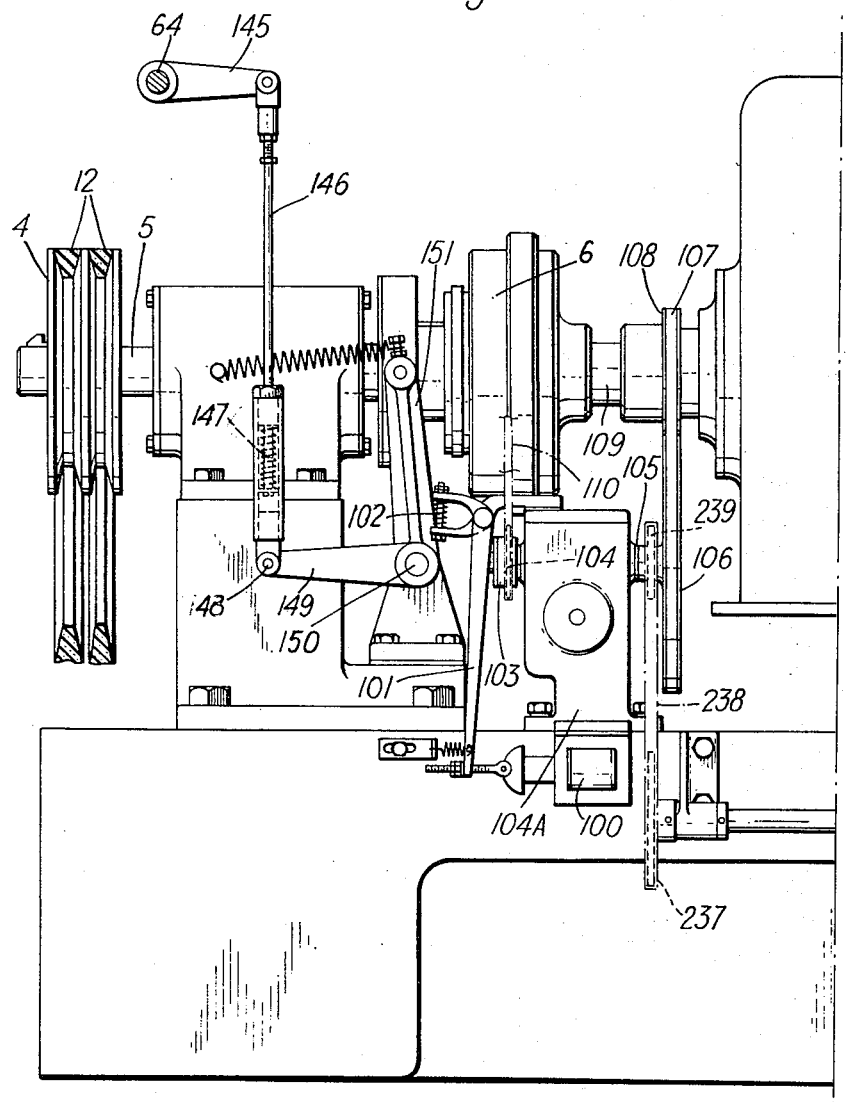

Figures 9 and 9a together constitute a view of the main driving motor and clutch as seen from the right in Figure 1;

Figure 10 is a side elevation of the variable brake control mechanism and clutch operating gear;

Figure 11 is a plan view in part section of part of Figure 10;

Figure 12 shows to a larger scale a detail of the feeler for the variable brake mechanism;

Figure 13 is a side elevation, as seen from the right in Figure 3, of the mechanism for raising the beam into position;

Figure 14 is a fragmentary plan view of the mechanism shown in Figure 13; and

Figure 15 is the electrical circuit diagram.

As seen in Figures 1 to 5 the warper comprises a base plate 1 at either side of which frames 2 are secured. The main driving motor 3 is mounted on the base plate and is an alternating current motor, the speed of which can be adjusted by rocking the brush gear. This motor drives twin V-belt pulleys 4 on a shaft 5 through a clutch 6 (Figure 9).

As seen in Figures 5 and 5a, each of the side frames 2 supports in front of the base member 1 a bearing 7 in which is journalled a transverse shaft 8. The shaft 8 on the left of the machine in Figure 5 carries on its inner end a headstock comprising a flanged member 9 to the periphery of which a twin V-belt pulley 10 is secured by bolts 11. This pulley is driven from the pulley 4 by a pair of belts 12. The flanged member 9 is also shaped as a brake drum having an inner cylindrical surface 13, against which internally expanding brake shoes, not shown, can act. The right hand shaft 8 in Figure 5a has a tail-stock comprising a similar flange member 14, also shaped to act as a brake drum and containing internally expanding brake shoes, also not shown. Each of the members 9 and 14 have fixed to their inner faces an arcuate member 15 having an inner radius centered at the axis of the shafts 8 and equal to the radius of flanges 16 formed on the ends of stub shafts 17 which form the hubs of the beam 18 which are to be mounted in the machine. These arcuate members 15 extend around about a quarter of the periphery of the flanges 16 and have each a radially movable driving dog 19 shaped at its inner end to engage in any one of a number of notches 20 in the flanges 16 and urged inwards by a compression spring 21. The plungers 19 are provided with hand knobs 22 to enable them to be withdrawn from the notches 20 against the action of the springs 21.

The shafts 8 are hollow, and have mounted to slide axially in their bores and to be freely rotatable therein, spigots 23, the inner ends of which engage in axial bushes 24 in the stub shafts 17 of the beam. The outer ends of these spigots have collars 25 freely rotatable on the spigots and from which pins 26 project to engage forked arms 27 on shafts 28 each of which can be turned to engage and withdraw the spigot 23 by means of a hand lever 29 on a shaft 30 which also carries an arm 31 at the end of which a sliding block 32 is pivoted which slides in a slot 33 in an arm 34 on the shaft 28. The hand levers 29 can be locked in the engaged position by means of catches 35 on the side frames 2, into which spring loaded pins 36, carried on members 37 clamped to the hand levers can engage. To provide a slight adjustment of the engaged position of the hand levers the sockets of the catches 35 are mounted eccentrically and can be adjusted and clamped in any position.

The mechanism for raising and lowering the beam into alignment with the shafts 8 and spigots 23 is shown in Figures 13 and 14. This comprises a pair of robust arms 38 on a shaft 39 carried in brackets 40 secured to the base member 1. The arms 38 may be raised and lowered by hydraulic jacks 41 pivoted at 42 to the arms and at 43 to the brackets 40. These jacks are supplied with hydraulic fluid through connections 44, 45 from an electrically operated hydraulic pump 46 through a valve controlled by a hand operated rod 47 extending to the front of the machine. At the free end of each arm a lug 48 is formed carrying a short shaft 49, to which members 50 are pivoted. These members each carry a roller 51 and their positions in relation to the arms 38 may be adjusted by set screws 52, as shown in Figure 13. The spacing of the rollers 51 on each arm is such that they can engage beneath and support the stub shafts 17 of the beam 18 and the setting of the members 50 is adjusted so that after a beam has been rolled on the floor of the shop into position above the rollers 51, and the arms 38 then raised by the jacks 41, the beam 18 is lifted into a position in which the flanges 16 and the bushes 24 of the stub shaft 17 are in exact alignment with the spigots 23 in the shafts 8. If, before this operation is carried out, the flange members 9 and 14 are set so that the arcuate members 15 are at their uppermost positions, the beam will be automatically raised into engagement with the arcuate members and will be held by these members in exactly the right position for the engagement of the spigots 23. The driving dogs 19 will then engage in the notches 20 in the flanges 16 immediately, or upon commencing rotation of the head-stock.

As seen in Figure 1, the warp yarns 53 reach the warper from a creel and, after passing through a pair of levelling rollers 54, a stop motion 55, and a sley 56, pass over a first tension roller 57, beneath a second tension roller 58, through a second sley 59 of the zig-zag expanding type to enable the spacing in the yarns to be accurately determined, over a third tension roller 60, and then down to the beam 18. As the mass of warp yarns on the beam increases the braking effort exerted on pull rods 61 (Figure 5) by which the internally expanding brake shoes in the flange members 9 and 14 are operated, must be correspondingly increased in order to pull the beam up in the same number of revolutions. The braking effort comes from a spring 62 (seen in Figures 4, 5, 10 and 11), the upper end of which is connected to an arm 63 on a shaft 64 which also carries an arm 65 connected by a link 66 to a rocker 67 pivoted at 68 in the left hand side frame 2 in Figure 5. The lower end of the rocker 67 is in the form of a collar 69 bearing upon an adjustable stop 70 on thte brake operating rod 61. On the right hand side in Figure 5a the brake operating rod 61 has a similar collar 71 upon which bears the lower end of a bellcrank pivoted at 73. This bell crank is connected by a Bowden cable 74 to the rocker 67 at 75. The lower end of the spring 62 is attached as shown in Figures 10 and 11 to the front end of a rocker arm 76 pivoted at 77 to turn about a transverse axis and having at its other end a follow roller 78 which rides upon the periphery of a cam 79 which, as shown in Figure 11, is secured to a transverse shaft 80 by means of a pin 81. A ratchet wheel 82 is secured to the cam 79 by screws 83 and is engaged by a pawl 84 pivoted on a stationary pin 85 carried by the bracket 85A to which the rocker 76 is pivoted. A collar 86 is freely rotatable on the shaft 80 and is held against longitudinal movement by two fixed collars 87. This collar carries a bent arm 88 which extends forward from the shaft 80 as shown in Figures 1, 10 and 11 to support a feeler 89, seen best in Figure 12, which is carried on a short arm 90 pivoted at 91 in a casing 92 mounted on the end of the arm 88. As shown in Figure 12 the weight of the arm 89 is counter-balanced to any desired extent by the weight 93 on an extension 94 of the arm 90 and this extension also carries a block 95 which can engage with either of the blades 96, 97 of a pair of microswitches 98, 99 in the casing 92. The feeler 89, as shown in Figures 1 and 10, rests on the surface of the sheet of warp yarns running from the tension roller 60 to the beam 18 so that, as the diameter of the yarns on the beam increases, the feeler is moved to actuate the microswitch 99. This excites a solenoid 100, shown in Figures 9 and 15 which acts through an arm 101 loaded by a spring 102 to cause the engagement of a clutch 103 to drive a sprocket wheel 104 on the output shaft of a reduction gear box 104A, the input shaft 104 of which carries a pulley 106 driven by a belt 107 from a pulley 108 on the main motor shaft 109. This sprocket wheel drives, by means of a chain 110, a sprocket wheel 111 secured to the cam member 79 in Figures 10 and 11 thus causing the cam member to rotate to adjust the position of the anchorage of the spring 62 so that the braking effort available for the beam 18 is increased. It will be seen that the mechanism just described for adjusting the tension in the spring 62 is a power servo system controlled by the feeler 89. At the same time a bush 112 keyed to the shaft 80 is rotated and thus carries a projection 113 which engages a spring loaded plunger 114 in the collar 86, thus raising the arm 88 until the casing 92 is high enough for the feeler 89 to return to its normal position with the block 95 pressing upon the microswitch blade 96 to open the switch 98 temporarily. When this occurs the clutch 103 is disengaged and the drive to the cam 79 and shaft 80 ceases. The circuit through the switches 98 and 99 and solenoid 100 is shown in Figure 15. The switch 98 is normally closed and is in series with the contacts 115 of a normally open relay, the coil 116 of which is connected in parallel with the solenoid 100 both coils being in series with the switch 98 and contacts 115. Upon the switch 99 being closed the solenoid 100 is excited and due to the current in the coil 116 the contacts 115 close. Thus if the switch 99 opens, the coil 116 and solenoid 100 are still excited through the switch 98 and contacts 115 until the feeler moves into a position where the switch 98 is opened momentarily, whereupon the circuit is broken and the relay contacts 115 once more open.

The collar 112 is slidable on the shaft 80 and is urged to the left in Figure 11 by a compression spring 117. The collar has a groove 118 which is engaged by the pins 119 of a forked member 120 pivoted at 121 and which is connected by a link 122 to a member 123 pivoted at 124 on the left side frame 2. A plunger 125 is arranged to slide in a bracket 126 secured to the frame and engages the opposite end of the member 123 to that at which the link 122 is pivoted. The other end of the plunger lies in the path of the hand lever 29 (Figure 5) when it is pushed inwards to introduce the spigots 23 into the ends of the stub shaft 17 of the beam 18. Thus, when these spigots are disengaged the spring 117 urges the collar 112 to the left in Figure 11 disengaging the drive to the spring loaded plunger 114 and thus leaving the arm 88 and feeler 89 free to take up any desired position. When the spigots are engaged, however, the drive is once more engaged.

The application and release of the beam brakes is controlled by the mechanism shown in Figures 4, 5, 7 and 8 which also controls the engagement and disengagement of the main driving clutch 6, as shown in Figures 9 and 10. A control box 127 is mounted on the left hand side frame 2, as seen in Figure 5, and through this a main control rod or bolt 128 (Figures 4 and 7) runs from front to back. This bolt is urged towards the rear by a compression spring 129 acting on a collar 130 and the rear end of the bolt bears upon an arm 131 (see Figure 4) on a transverse shaft 132 which also carries a main manual control rail 133 which projects over the front of the machine above the beam at a height convenient to the operator. The shaft 132 carries at the right hand end as seen in Figure 8 an arm 134 similar to the arm 131 and this engages a similar bolt 135, similarly loaded by a compression spring 136 bearing on a collar 137 in a box 138 secured to the right hand side frame 2. The bolt 128, however, also carries a member 139 rigidly clamped to it and formed with a pair of cam surfaces 140, 141. The arm 65 of the brake operating mechanism carries a roller 142 (Figure 5) which is pressed by the action of the spring 62 against the cam surface 141. In the position shown in Figures 4, 4a the brakes are applied and the clutch 6 disengaged. Upon pulling the control rail 133 forward and downward the bolts 128 and 135 are urged forwards against the springs 129, 136, and the cam surface 141 urges the arm 65 anticlockwise as seen in Figure 5, thus releasing the beam brakes. When the brakes have been released, the cam surface 140 engages a roller 143 on an arm 144 (Figure 7), also rotatable on the shaft 64 and having a crank arm 145 from which a pull rod 146 runs to a spring loaded connection 147 (see Figure 9) which is pivoted at 148 to an arm 149 on the shaft 150 which carries the actuating lever 151 of the main clutch 6. Thus the engagement of the main clutch cannot take place until after the brakes have been released. At the end of the forward movement of the bolt 128, a pin 152 at its front end engages a microswitch 153 (Figures 4 and 15) which closes, thus energising the relay 154 in Figure 15 which acts to close the contacts 155 in parallel with the switch 153 and also to close the contacts 156 in series with the solenoid 157 which (as seen in Figure 7) causes clockwise rotation of a member 158 pivoted at 159 so that a flange 160 engages behind the collar 130 on the bolt 128. The bolt is thus latched in the running position until the circuit through the relay 154 is broken. This can be brought about by depression of either of the two stop buttons 161, 162 in Figure 15, or by the opening of the contacts 163 upon excitation of the relay coil 164 which may be brought about by the droppers of the stop motion 55 or by closing either of the additional stop switches 165, 166. The stop motion 55 has in series with it an isolator switch 167 which is closed during normal running.

The cam surface 141 also controls the application of full stopping retardation upon the tension roller brakes. Each of the tension rollers 57, 58 and 60 are freely rotatable on bearings mounted on the side frame of the machine. The tension roller 58 is readily detachable, being mounted at each end on shafts to which it is attached by bayonet type couplings controlled by the knobs 168 as seen in Figures 2, 2a, 5 and 7. Each of the tension rollers 57, 58, and 60 is provided at each end with a single brake shoe 169, 170, 171, respectively at the right hand end as seen in Figures 3a and 8, and with brake shoes 188, 189, 190 respectively at the left hand end as seen in Figures 3 and 7 pivoted to the frame work of the machine at 172, 173, 174, 191, 192, 193 respectively (Figures 7 and 8). These shoes are used to impart the necessary tension to the yarns as well as for pulling up the tension rollers when the machine is to be stopped. The amount of tension which can be imparted to a yarn as it passes over the tension rollers depends upon its initial tension and the angle through which it is wrapped around the roller as well as on the coefficient of friction. For this reason only comparatively light tension can be imparted by the roller 57 while considerably more can be imparted by the roller 58 since the yarns reach that roller under the tension already imparted by the roller 57, and even greater tension can be imparted by the roller 60. This means that only a small braking effort must be applied to the roller 57, a somewhat greater effort must be applied to the roller 58, and a considerably greater effort must be applied to the roller 60. As seen in Figure 8, this result is achieved at the right hand end by a balancing linkage distributing a single braking force applied to a plunger 175 (Figures 4 and 8), to the operating rods 176, 177, 178 of the brake shoes 169, 170, 171 respectively, through a balancing linkage comprising a rocker arm 179 pivoted at the top of the plunger 175 and having a relatively short arm pivoted to the rod 178 and a comparatively long arm pivoted at 180 to a second rocker 181, having a comparatively short arm pivoted to the operating rod 177 at 182 and a comparatively long arm pivoted to the rod 176 at 183. The tension braking effort is applied to the plunger 175 by the weight 184 at the end of an arm 185 pivoted at 186 and having a short extension 187 which bears upon the lower end of the plunger 175 (as seen in Figure 4a).

At the left hand end, each of the brake shoes 188, 189, 190 has an operating rod 194, 195 and 196, respectively (Figure 7). These rods extend downwards through the top of the control box 127 and end, as seen in Figures 4, 5 and 7 immediately above three corresponding spring loaded plungers 197, 198, 199 respectively, which when the machine is to be stopped are urged upwards to exert full braking effort upon the brake shoes by adjustable springs such as the spring 200 in Figure 5. During normal running these plungers are prevented from engaging the operating rods 194, 195 and 196 by three forked members 201, 202, 203 secured to a shaft 204 running from front to back of the control box 127 (Figure 4). This shaft carries a downwardly extending arm 205, seen in Figure 5, which is linked to the rocker 67 of the main brake actuating linkage by means of a tie rod 206. Thus, when the cam surface 141 causes the release of the main beam brake, it also causes clockwise rotation of the arm 205, as seen in Figure 5 with the result that the forks 201, 202, 203 force the plungers 197, 198 and 199 downwards out of engagement with the rods 194, 195, 196. Tension braking effort is applied to the brake rods 194, 195, 196 by a balancing linkage 263, 264 (Figure 7), exactly similar to the linkage 179, 181, and urged upwards by an adjustable spring 265 (Figure 4) acting on the link 263 in exactly the same manner as the end 187 of the weighed arm 188 acts upon the plunger 175.

Figure 2A:
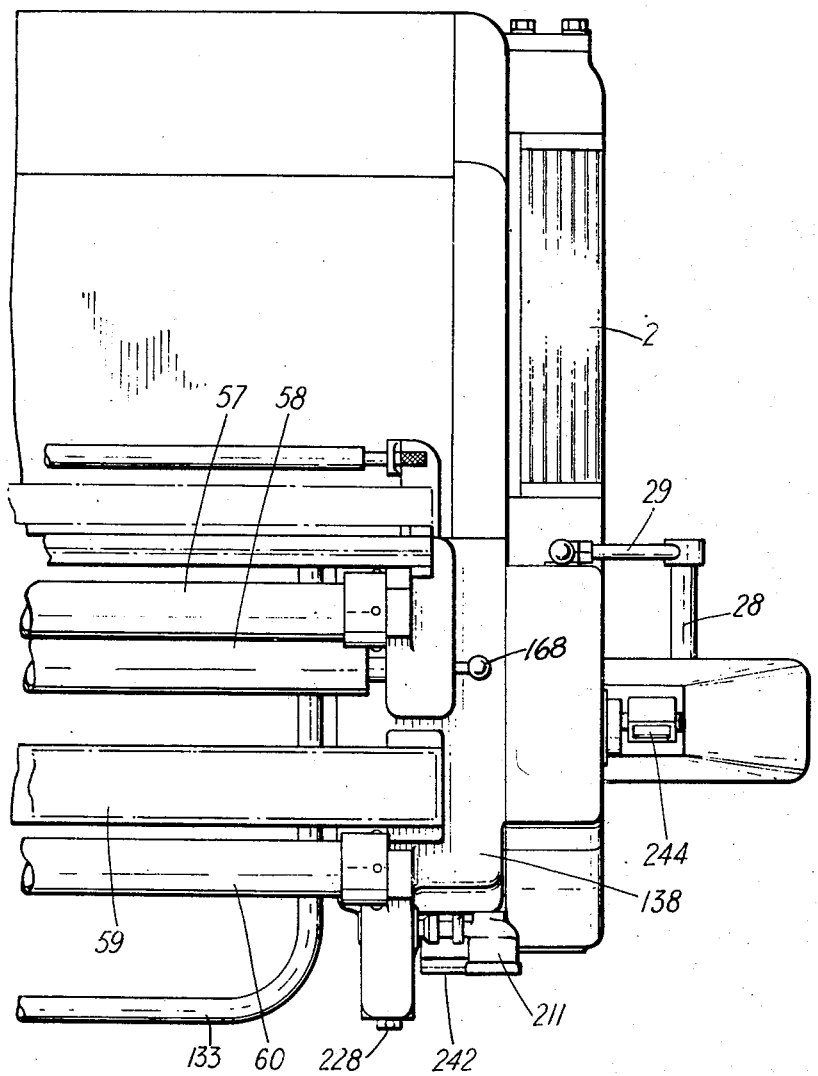

As shown in Figures 2a, 3a and 8 the tension roller 60 has on its shaft 207 a pulley 208 from which a belt 209 drives a pulley 210 on the shaft of a speedometer 211 (Figures 2 and 3). As shown in Figure 15 this speedometer has on its dial a pointer 212 driven by the speedometer mechanism, and a hand set pointer 213. These pointers are insulated from each other electrically and each carries a contact 214 such that, when the speed of rotation of the roller 60 reaches the value set by the hand set pointer, these two contacts close, completing a circuit through a relay coil 215 which closes the contacts 216 in series with the solenoid 217, seen in Figure 15, and in Figure 9a. When this circuit is completed the solenoid moves the bell crank 218 in Figure 9a anti-clockwise against the action of a spring 219, causing the spring loaded coupling 220 to be compressed, pressing the lever 221 downwards. This lever acts to engage a clutch in the reduction gear box 222 so as to cause rotation of the sprocket wheel 223 which drives the brush rocking gear of the motor 3 through the chain 224 and sprocket wheel 225 on the shaft 227. The direction of rotation of the shaft 226 when the solenoid 217 is excited is such as to reduce the speed of the motor 3. Thus as the diameter of the warp on the beam increased, causing the speed of the roller 60 to tend to increase, the motor speed is periodically reduced to maintain the yarn speed substantially constant.

To enable the motor 3 to be speeded up or slowed down at the wish of the operator, a hand lever 228 is provided alongside the speedometer, as shown in Figure 3a, on a shaft 229 which carries at its rear end an arm 230 (see Figure 4a), to which is pivoted a link 231 connected at its lower end, as shown in Figure 9a, to an arm 232 pivoted at 233 and having a pair of projections 234, 235 which can engage the arm 221 to either raise or lower it, thus driving the shaft 226 so as either to increase or decrease the speed of the motor 3. The reduction gearing in the gear box 222 is driven by a shaft 236 which carries a sprocket wheel 237 driven by a chain 238 from a sprocket wheel 239 on the constantly driven output shaft of the reduction gear box 104A.

The shaft of the speedometer 211 carries a pulley 240 which drives a pulley 241 on the input shaft of a yardage counter 242, as shown in Figure 3 and Figure 8. Contacts may be provided in this counter to close upon a given yardage having been wound, and these are indicated at 243 in Figure 15 in parallel with the stop switches 165, 166 and the stop motion 55 so that upon these contacts 243 closing the solenoid 164 is energised, opening the contacts 163 and causing the clutch to open and the brakes to be applied. A revolution counter 244 is also fitted, as shown in Figures 2a, 3a and 5a and is driven from a pulley 245 on the right hand shaft 8 in Figure 6 through a belt 246 and pulley 247 on the input shaft of the revolution counter. This counter may also have contacts which close upon a certain number of revolutions being recorded and these are shown at 248 in Figure 15 in parallel with the contacts 243, thus acting in the same way to cause the clutch to disengage and the brakes to be applied.

As shown in Figure 15 the warper draws its energy from a three phase alternating current supply through a main fused isolating switch 249 which supplies current to a starter motor switch and fuses 250 of the pump motor 46 and also to the starter switch 251 of the main driving motor 3. The input to this latter switch is provided with overlead releases 252 and the contacts are operated by a solenoid 253, the current for which passes through an overload cut out 254. When this solenoid is energised, closing the main contacts 262 and the auxiliary contacts 255 the solenoid 253 receives current through the normally closed stop button contacts 256 and motor interlock 257 from one of the phases of the supply, as shown. To start the motor by exciting the solenoid 253 when the auxiliary contacts 255 are open a push button starting switch 258 is provided in parallel with the contacts 255. The microswitches 98 and 99 and 153, the relays 116 and 154, and the solenoids 100, 217 and 157 receive current by connecting their circuits directly across two of the phases from the main switch 249, all the auxiliary circuits being protected by fuses 259, 260. These fuses also supply current to a step-down transformer 261 from the secondary of which the current is drawn for the speedometer contacts and relay 215 and for the relay 164, as shown.

To prevent the machine being started except when the spigots 23 are fully engaged with the beam, members 362 are provided (seen in Figure 4a) having adjustable stops 365 for engagement by the hand levers 29 (Figure 5). The members 362 are urged outwards by springs 266 and are flat bars having holes through which the bolts 128, 135 pass. These holes are of such shape and size, that collars in the bolts 128, 135 cannot pass through the holes except when the members 362 have been urged fully inwards by the levers 29.

We claim:
1. A warping machine comprising a machine frame, a pair of endstocks each rotatably journalled in said frame and supporting in driving relationship a warp beam on which a sheet of warp yarns is wound, means to drive at least one of said endstocks, a sensitive feeler located to bear against the sheet of warp yarns along a line prior to the sheet arriving at the warp beam, a brake applied to retard the rotation of at least one of said endstocks, and means controlled by said feeler for adjusting the effort applied to said brakes.

2. A warping machine comprising a machine frame, a pair of endstocks each rotatably journalled in said frame and supporting in driving relationship a warp beam on which a sheet of warp yarns is wound, means to drive at least one of said endstocks, a sensitive feeler located to bear against the sheet of warp yarns along a line prior to the sheet arriving at the warp beam, a brake applied to retard the rotation of at least one of said endstocks, a brake-applying spring, a linkage connecting said spring to said brake and means controlled by said feeler for adjusting the stress in said spring as the amount of warp yarns wound on said beam increases.

3. A warping machine according to claim 2, further comprising a source of mechanical power, a cam having its follower linked to said brake-applying spring and means controlled by said feeler for coupling said source of mechanical power to said cam.

4. A warping machine according to claim 1, further comprising an electric motor in driving connection with said driven endstock, a brake applying spring, a cam having its follower linked to said brake-applying spring, a clutch arranged to couple said motor to said cam, a solenoid operatively connected to actuate said clutch, a circuit for supplying current to said solenoid and a switch in said circuit actuated under control of said feeler.

5. A warping machine comprising a machine frame, a pair of endstocks each rotatably journalled in said frame and supporting in driving relationship a warp beam about which a sheet of warp yarns is wound, means to drive at least one of said endstocks, a sensitive feeler located to bear against the warp yarns so as to be deflected as the amount of warp yarns wound on said beam increases, a brake applied to retard the rotation of at least one of said endstocks and a power servo system controlled by said feeler and having its power-driven output connected to adjust the effort applied to said brake.

6. A warping machine according to claim 5, further comprising a movable support for said feeler mounted upon a relatively massive movable support, a first blade carried by said first-named support, a second cooperating blade mounted on said massive support and arranged to come into contact upon movement of said feeler to control said servo system and means connecting the power-driven output of said servo system to said massive support to cause same to follow up movements of said feeler until said contact member and contact are separated.

7. A warping machine according to claim 6, further comprising a support for said feeler including a relatively massive pivoted arm and a light arm bearing said feeler and pivotally mounted on said massive arm, a pair of cooperating blades carried respectively on said massive arm and on said light arm so as to be actuated upon movement of said feeler due to increase of diameter of the warp upon the beam to close said switch and thereby energize said solenoid and engage said clutch and means linking said clutch to said massive arm to drive the latter, again to separate said blades.

8. A warping machine according to claim 7, further comprising a second switch carried by said massive arm and located to be actuated to interrupt the circuit of said solenoid upon the said massive arm following up the said light arm to restore the previous relative positions of the same.

9. A warping machine as claimed in claim 1 comprising a plurality of tension rollers to apply tension to the sheet of warp yarns before same arrive at the warp beam, a plurality of brakes each respectively applied to one of said tension rollers, means for applying full stopping effort to each of said brakes, a manually operated member for stopping the machine and means operatively connected to said manually operated member to hold said full stopping effort out of action during the normal running of the machine.

10. A warping machine according to claim 9, further comprising a brake applied to stop the rotation of at least one of said endstocks and means connecting said last-mentioned brake to said manually operated member whereby said last-mentioned brake is applied to stop the machine when the full stopping effort is brought into action on said tension roller brakes.

11. A warping machine according to claim 10, further comprising a clutch arranged to couple said driving means to said driven endstock and means for connecting said clutch to said manually operated member so that after the latter is operated to release the brakes, said clutch is engaged.

12. A warping machine as claimed in claim 1 comprising a plurality of tension rollers to apply tension to the sheet of warp yarns before same arrive at the warp beam, a plurality of brake shoes each cooperating respectively with one of said tension rollers, a balancing pivoted lever linkage subjected to a rocking pressure and a plurality of brake-actuating push rods each operative upon one of said brake shoes and pivoted at selected points in said lever linkage to apply braking effort to said brake shoes and thereby to apply progressively increasing tension to the warp yarn as the warp beam is approached.

13. A warping machine according to claim 12, further comprising means for applying full stopping effort to each of said brake shoes, a manually operated member for stopping the machine and means operatively connected to said manually operated member to hold said full stopping effort out of action during the normal running of the machine.

14. A warping machine as claimed in claim 1 in which said warp beam is provided with a notch adjacent each of said endstocks and each of said endstocks comprises a central idle spigot adapted to enter an axial bore in a warp beam to support same, a flanged member, a brake drum secured to said flanged member, an arcuate member carried on the face of said flanged member to engage a cylindrical surface of the warp beam to center the latter and a driving bolt movably mounted in said arcuate member to be engageable in the adjacent notch in the warp beam.

15. A warping machine as claimed in claim 1 comprising a beam-lifting cradle to receive the hubs of the warp beam near to its ends and pivoted about a longitudinal horizontal axis to the lower part of said machine frame, and power means for swinging said cradle up about its pivotal axis to lift the warp beam until its axis is alined with the axis of the pair of endstocks.

References Cited in the file of this patent
UNITED STATES PATENTS

| | | |
|---|---|---|
| 1,209,122 | Colman | Dec. 19, 1916 |
| 2,342,151 | Lambach | Feb. 22, 1944 |
| 2,674,778 | Morrison et al. | Apr. 13, 1954 |